March 5, 1957 L. F. HOPE 2,783,649
AUTOMATIC BALANCING MACHINE
Filed March 10, 1954 3 Sheets-Sheet 1
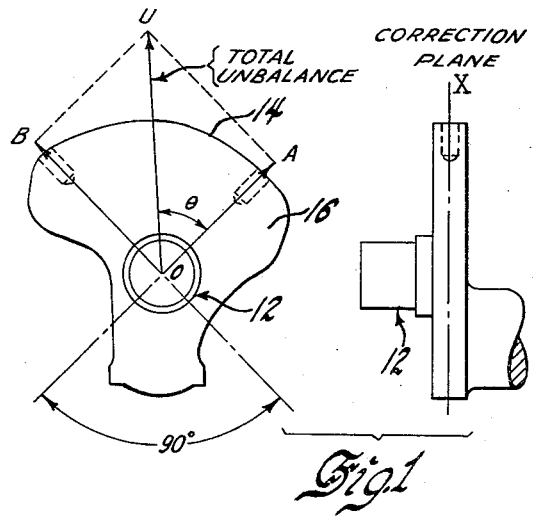
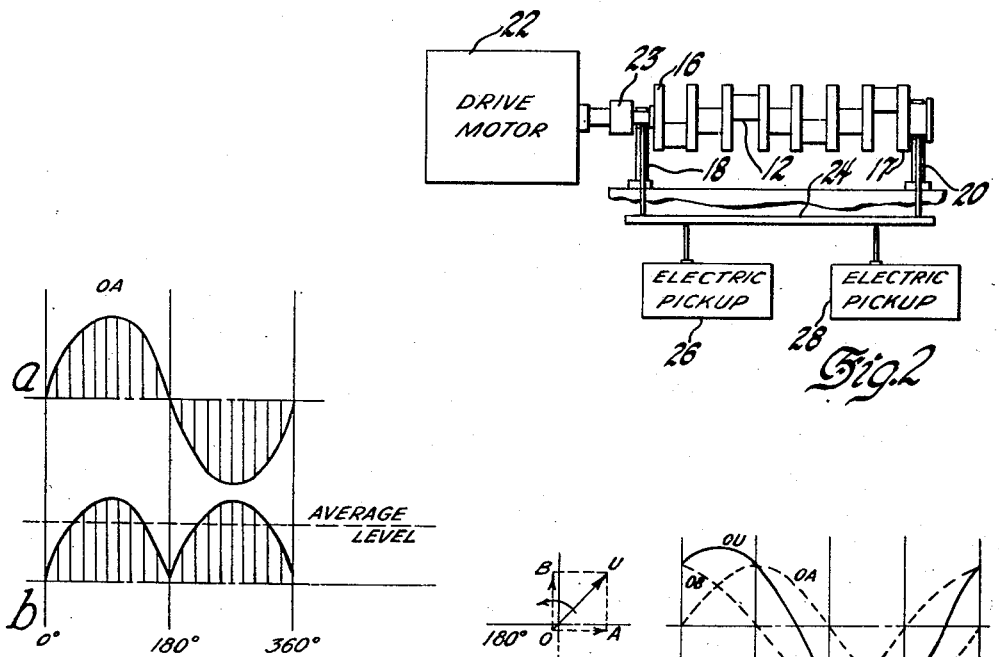
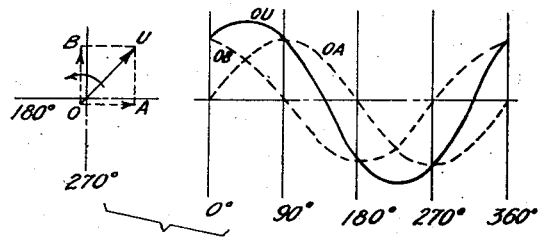
INVENTOR
Lawrence F. Hope
BY
L. D. Burch
ATTORNEY INVENTOR
Lawrence F. Hope
BY
ATTORNEY March 5, 1957     L. F. HOPE     2,783,649
AUTOMATIC BALANCING MACHINE
Filed March 10, 1954     3 Sheets-Sheet 3

INVENTOR
Lawrence F. Hope
BY L. D. Burch
ATTORNEY

United States Patent Office 2,783,649
Patented Mar. 5, 1957

2,783,649

AUTOMATIC BALANCING MACHINE

Lawrence F. Hope, Grosse Pointe, Mich., assignor to General Motors Corporation, Detroit, Mich., a corporation of Delaware Application March 10, 1954, Serial No. 415,265

9 Claims. (Cl. 73—464)

This invention relates to balancing machines of a type particularly adapted for automatically effecting unbalance determinations and corrections in elongated rotating bodies such as crankshafts and the like.

The invention is specially suited for use in a balancing installation in which engine crankshafts are initially "rough-balanced" prior to assembly in an engine, and thereafter are "finish or assembly-balanced" in the engine to correct for any unbalance remaining in the shaft and for such additional unbalance as may be contributed thereto by other components of the engine.

In such a balancing system, it is desirable to perform the rough balancing correction for any particular transaxial plane of correction at two predetermined points angularly spaced, say 90 degrees, apart on the counterweight of a crank cheek containing the plane of correction, thereby to provide a clear unobstructed sector between these two fixed points on the counterweight in which the finish-balance correction may be performed. Where the balance correction is effected by removal of metal from the crankshaft as by an associated drilling organization, the foregoing balancing procedure avoids unbalance correction difficulties that are presented when the angular location of the total rough unbalance and the finish or assembly-unbalance nearly coincide. Furthermore, less stressing of the crankshaft is encountered since the unbalance compensation is performed at several distributed points where a lesser amount of metal is removed than at but a single point as is done in prior balancing practices.

The invention is further characterized by being entirely automatic in operation, and in distinction to prior balancing machines and organizations, does not require any manual adjustment nor reading of controls or instruments by an operator to effect a determination of the unbalance in the crankshaft.

Accordingly, the invention has for its general object to provide apparatus in accordance with the above and, more specifically, an automatic balancing installation in which the total unbalance for any particular plane of correction is automatically resolved into two angularly spaced components at fixed locations on the work-piece and in which the balance correction may be performed at such locations automatically without human intervention.

In the drawings:

Fig. 1 illustrates a portion of a crankshaft to be balanced in accordance with the present invention;

Fig. 2 is a part of a balancing machine in accordance with the present invention;

Figure 6:
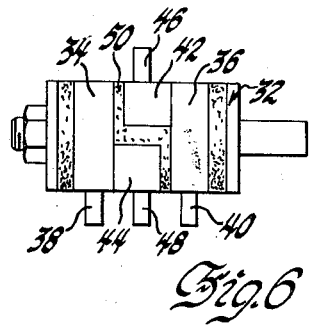
Figure 7:
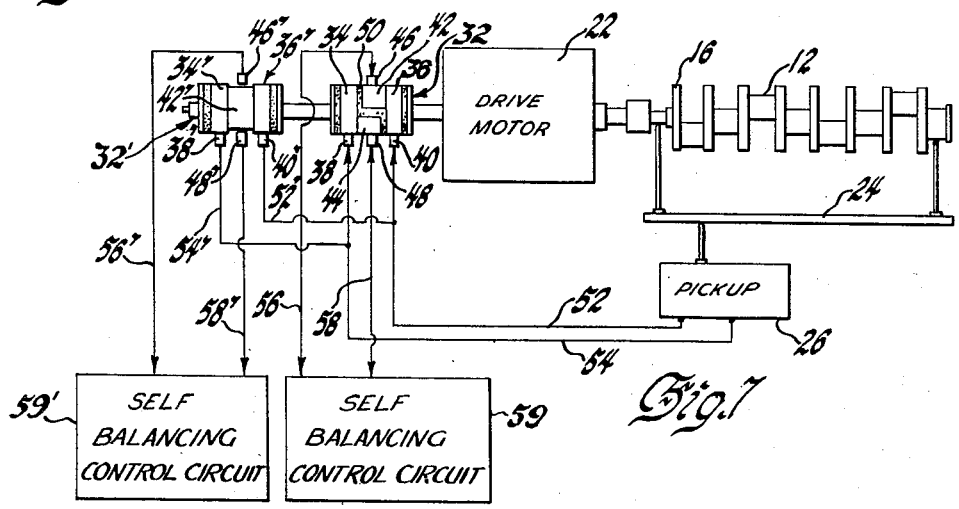
Figure 8:
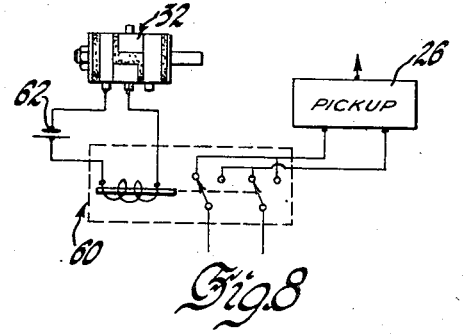
Figure 8A:
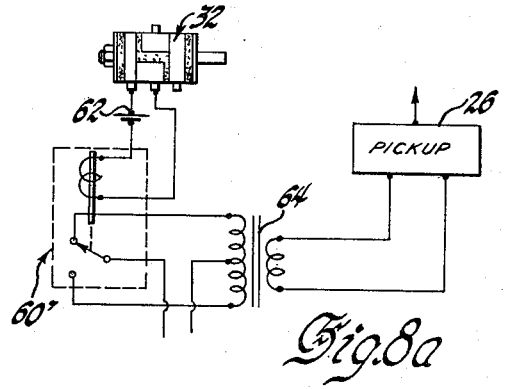
Figure 9:
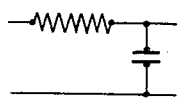
Figure 9A:
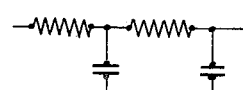
Figure 9B:
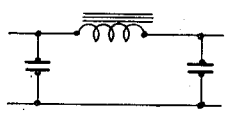
Figure 9C:
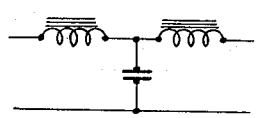
Figure 10:
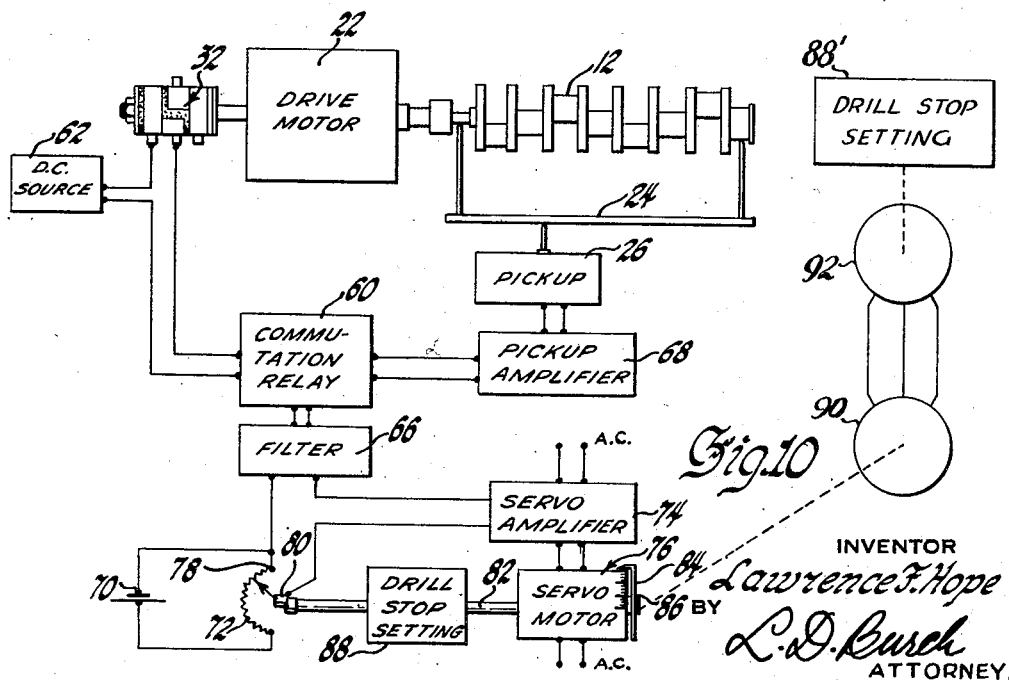

Figs. 3, 4, 5 7a and 7b are curves that are useful in explaining the present invention;

Fig. 6 is a part of the apparatus of the present invention;

Figs. 7, 8 and 8a illustrate alternative electrical circuits of a part of the invention installed in the apparatus of Fig. 6;

Figs. 9, 9a, 9b and 9c are alternative circuits of another part of the apparatus of the present invention; and Fig. 10 is a schematic and block diagrammatic showing of a balancing apparatus in accordance with the present invention.

Referring to the drawings, Fig. 1 illustrates the end of a crankshaft 12 with a transaxial plane in which the unbalance correction is to be performed labeled X thereon. This end of the crankshaft is to be placed in balance by drilling holes at A and B, which are spaced 90 degrees apart on the counterweight 14 of a cheek 16 containing the correction plane. The present invention automatically determines the depth of hole to be drilled at each of these locations.

Fig. 2 illustrates the crankshaft 12 installed in a balancing arrangement employed in the present invention and includes a mounting fixture in the form of resilient or oscillatable supports 18, 20 that permit vibration of both ends of the crankshaft in an axial plane thereof; a constant speed drive motor 22 coupled to and rotating the shaft about its axis; a mechanical nodal bar 24 suitably coupled to the shaft supports so as to permit it to oscillate in synchronism with the shaft; and a pair of vibration pick-up devices 26, 28 mounted at the nodal points of the nodal bar for indicating the unbalance in the end counterweights 16 and 17 of the shaft. In accordance with conventional balancing practice, the crankshaft is coupled to the drive motor through a suitable coupling arrangement 23 which may comprise a pair of spaced universal joints that permit free oscillation of the shaft under the influence of the unbalance forces therein.

No attempt has been made to show any particular construction of mounting supports for the shaft and nodal bar, the drawings being, for the most part, of a diagrammatic nature to bring out principles of operation rather than particular details of construction. One such manner in which the chankshaft may be rotatably mounted to be free to oscillate is illustrated and described in U. S. Patent 2,293,371 in the name of T. C. Van Degrift assigned to the present assignee. Reference also is made to the above patent for a description of the construction and theory of operation of the nodal bar 24. The nodal bar is mounted in an axial plane normal to the plane of the shaft supports and is illustrated in the position shown in Fig. 2 only for convenience of the drawings.

The vibration pick-ups 26 and 28 are conventional electro-magnetic devices each of which generates an alternating current voltage proportional to the velocity of the oscillatory vibrations appearing at respective ones of the aforementioned nodal points. The alternating current signal from each of the pick-up devices has a frequency equal to the rotational speed of the balancing machine and an amplitude proportional to the total unbalance component OU of Fig. 1. The pick-up voltage OU from one of the pick-up devices is shown in Fig. 3 both vectorially and as voltage vs. time, along with the quadrature or conjugately related components OA and OB thereof representing the magnitude of the unbalances which are to be drilled out at the locations A and B, respectively of Fig. 1.

If the component OA of Fig. 3 is treated as shown in Fig. 4; that is, if the negative pulses or alterations appearing in the second half cycle from 180 to 360 degrees are commutated or reversed in direction, as shown in Fig. 4b, a pulsating unidirectional voltage will be obtained which has an average voltage of 63.7% of the peak value of the component OA.

Figure 5:
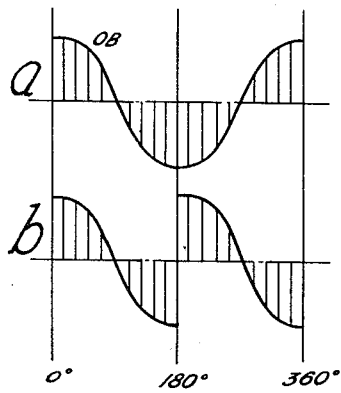

Under the same conditions of commutation, the component OB of Fig. 3 would be treated as shown on Fig. 5, that portion of the component appearing in the interval from 0 to 180 degrees would be unchanged and the second half would be reversed in phase, as shown in Fig. 5b, resulting in a fluctuating voltage with an average value of zero.

Thus, a commutation which passes the interval from 0 to 180 degrees unchanged and which passes the interval from 180 to 360 degrees with the phase reversed would yield a voltage whose average level would be equal to 63.7% the peak value of the component OA and affords an effective mechanical method of separating and measuring the magnitude of this component of the total unbalance voltage OU. The OB component can be separated by a similar commutation process in which the commutation is simultaneously performed 90 electrical degrees in advance of or behind the commutation of the OA component.

A commutator 32 suitable to perform the operations just described is shown in Fig. 6 and comprises a pair of spaced end sections each of which includes a separate continuous ring, as 34, 36, maintaining continuous contact with a brush, as 38, 40 associated therewith throughout the complete revolution of the commutator, and a center section, which includes a pair of arcuate conducting ring sections as 42, 44, and diametrally opposed brushes 46, 48. The center ring sections 42, 44 are electrically separated from one another by an insulating segment shown at 50 and are adapted to make connection with the end ring sections 34, 36 through the center brushes 46, 48 thereon. Thus, the center brushes contact opposite end rings for half a revolution and then exchange circuit contact, completing a circuit through either of the brushes 38, 40 associated with respective ones of the end rings.

Figure 7B:
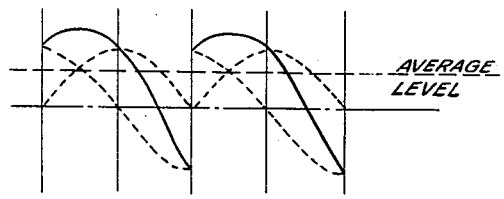
Figure 7A:
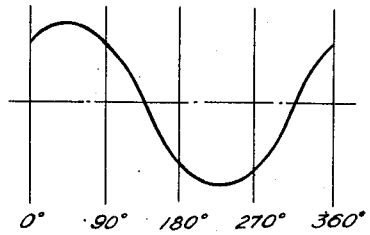

If such a commutator is added to the balancing machine of Fig. 2 so as to be driven by the drive motor 22 in synchronism with the rotating crankshaft, as shown in Fig. 7, the signal output, depicted in Fig. 7a, of a pickup device applied over conductor line 52, 54 to the end brushes 38, 40 of the commutator will be commutated to yield the output shown in Fig. 7b. The commutator output is a fluctuating unidirectional voltage supplied over the conductors 56, 58 to a suitable utilizing circuit or device, such as a self-balancing control circuit 59, and has an average value proportional to the component of unbalance OA which is to be drilled out of the #1 counterweight, 16.

In like manner, the component OB may be obtained using a second commuator whose center brushes are phased 90 degrees relative to the commutator, obtaining the component OA. This is indicated diagrammatically by the commutator 32' phased 90 degrees in space relative to commutator 32 and connected to receive the pick-up signal simultaneously with commutator 32. The commutator output is similarly supplied to a self-balancing control circuit 59'. The components of unbalance at the other end of the crankshaft may be obtained by a similar set of phased commutators.

Figures 8 and 8a are two alternate commutating systems using relays and a commutator that provide some simplification in machine wiring. In each case, the commutator 323 energizes thhe commutation relay 60 from a battery 62 for one half revolution, obtaining the connections shown. During one half revolution, one set of fixed contacts of the relay of Fig. 8 or one contact terminal of the relay of Fig. 8a is connected in circuit with the pick-up signal and during the other half revolution, the opposite set of fixed contacts of Fig. 8 or the opposite terminal of the relay of Fig. 8a is in circuit with the pickup signal. The resultant output is the same as shown on Fig. 7b. The commutation relay 60 of Fig. 8 has a pair of armatures each of which has a separate pair of fixed contacts associated therewith. A relay 60' having a single armature and set of fixed contacts may be employed where the output of the pickup is applied to the relay contacts through a center-tapped transformer 64, as shown in Fig. 8a.

It may be necessary to reduce the fluctuations of the average level of the commutated components, as the component OA of Fig. 7b for example, in order to use the commutated signal in an automatic positioning system. This may be accomplished by means of a low pass filter 66, various forms of which are shown in Figs. 9, 9a, 9b and 9c, all commonly used and described in detail in standard electrical engineering texts. The objectionable ripple may be reduced to a tolerable level, leaving a substantially constant D. C. voltage which may be used to control automatic unbalance correction setting equipment.

An automatic balancing system based on the foregoing is shown in Fig. 10 and includes a self-balancing, adjustable amplitude comparison circuit operating on the closed-loop servo principle for automatically indicating an unbalance quantity and positioning an adjustable drill stop setting element to effect exact compensation for the amount of unbalance at a correction location. The self-balancing circuit illustrated in Figure 10 is repsponsive to one of the quadrature related unbalance components and corresponds to the circuit 59 of Figure 7. It will be understood, of course, that an identical circuit responsive to the other unbalance component is provided and corresponds to circuit 59' of Figure 7. The output of the pick-up device 26 is amplified in an amplifier 68 and applied through a mechanical interrupter system comprising the commutator 32 and commutation relay 60 with its associated energizing source 62 to the input of the ripple filter 66. The filter output, representing the unbalance signal, is connected in circuit with the amplitude comparison circuit, which comprises a standard source or cell 70 and associated adjustable potentiometer 72 and a conventional servo amplifier 74 and associated two-phase servo-motor 76. The D. C. unbalance signal from the filter 66 is supplied to the amplitude comparison circuit in such manner as to be opposed by or differentially combined with a portion of the voltage of the reference source appearing between the terminal 78 and the adjustable arm 80 of the potentiometer 72, and the resultant difference or error signal is applied to the input of the servo-amplifier. The servo amplifier is powered from a local source of alternating current and supplies an alternating current signal to the control winding of the servo-motor, the reference or other phase winding of which is energized from the local source of alternating current. The control signal from the output of the servo-amplifier corresponds in phase and magnitude to the relative polarity and magnitude of the error signal and controls the servo-motor, the rotor shaft 82 of which is operatively connected to the arm 80 of the reference signal potentiometer 72 to rotate in such direction and an amount as will reduce the error signal to zero, at which point the system will be balanced and the motor or translating device will cease moving.

An indicating arrangement in the form of a graduated indicator dial 84 mounted on, say, the stator casing of the servo-motor and a pointer 86 carried by the rotor shaft may be employed to indicate the amount of unbalance at one of the afore-mentioned predetermined points lying in the selected correction plane.

The servo-motor shaft can be directly coupled to the potentiometer arm or additionally could be operatively connected to drive a suitable drill stop setting mechanism 88, which in its simplest form could be merely an adjustable stop on a conventional drilling organization associated with the balancing apparatus of the invention. Where the drilling organization is separate and removed from the balancing installation a telemetering system between the balancing machine and remote drilling machine could be employed. A suitable form that the telemetering system may assume may be one which employs a self-synchronous transmitter device 90 located at the balancing station and connected to the shaft of the servo-motor 82, and a self-synchronous receiver device 92 located at the drilling station and electrically connected to the transmitter device to follow the movement thereof and position the remote drill stop setting element 88' on the driller.

In order to obtain the magnitude of the unbalance component at the other of the aforementioned predetermined correction points in the selected transaxial plane, the amplified output of the pick-up device 26 is simultaneously applied to a second interrupting arrangement as shown in Figure 7 which includes a separate commutator phased 90 degrees to that illustrated in Fig. 10 and a commutation relay 60 together with a separate filter and self-balancing amplitude comparison circuit. The magnitude of the unbalance at the two correction points located in the correction plane at or near the other end of the crankshaft is determined by another pick-up device 28 (Figure 2) and associated set of quadrature related commutators or interrupter devices, such as that shown in Figure 7, each of which has a separate filter and self-balancing adjustable comparison circuit associated therewith, as shown in Figure 10.

What is claimed is:

1. Apparatus for automatically resolving the total unbalance in a transaxial plane of a rotating body into a pair of radially directed components extending through a pair of fixed angularly spaced points on said body, said apparatus comprising the combination of means supporting said body for rotation about its axis, means rotating said body about its axis, vibration pick-up means responsive to vibrations induced by unbalance in said body and developing a periodically varying electrical signal having characteristics related to the unbalance in said body, a pair of angularly-spaced circuit interrupting commutating devices rotated in synchronism with said body and electrical connections from said vibration pick-up means to said commutating means, said commutating means reversing the connections from said pick-up means at 180 degree intervals and having the same angular relationship therebetween as that between the said fixed points on said body, and separate circuit utilizing means connected in circuit with each of said interrupting devices providing an indication of the magnitude of unbalance at respective ones of said points on said body.

2. Apparatus in accordance with claim 1 above wherein each said utilizing means includes adjustable circuit means for comparing the amplitude of the commutated unbalance signal from a respective one of said commutating devices with a comparison signal derived from a reference source of potential contained in said comparison circuit means and translating means actuated by the difference signal between said commutated unbalance signal and said comparison signal and operatively connected with said adjustable circuit means for reducing said difference signal to zero.

3. Apparatus in accordance with claim 1 above wherein each said utilizing means includes adjustable circuit means for comparing the amplitude of the commutated unbalance signal from a respective one of said commutating means with a comparison signal derived from a reference source of potential contained in said comparison circuit means, translating means actuated by the difference signal between said commutated unbalance signal and said comparison signal and operatively connected with said adjustable circuit means for reducing said difference signal to zero, and an indicating dial and pointer on said translating means indicating the magnitude of unbalance at a respectively associated one of said points.

4. Apparatus in accordance with claim 1 above wherein each said utilizing means includes adjustable circuit means for comparing the amplitude of the commutated unbalance signal from a respective one of said commutating means with a comparison signal derived from a reference source of potential contained in said comparison circuit means, translating means actuated by the difference signal between said commutated unbalance signal and said comparison signal and operatively connected with said adjustable circuit means for reducing said difference signal to zero, and positionable means operatively connected for movement by said translating means an amount corresponding to the magnitude of the unbalance at an associated one of said points on said body.

5. Apparatus for automatically separating and resolving the unbalance ascribable to a particular plane of correction of an elongated rotating body into a pair of components representative of said unbalance at a pair of fixed points on said body spaced 90 degrees apart in said correction plane, said apparatus comprising, in combination, means supporting said body for rotation about its axis, means rotating said body about its axis, a nodal bar extending longitudinally of said body and operatively connected to said supporting means, vibration pick-up means mounted at a nodal point of said nodal bar and developing a periodically varying signal having characteristics related to the total unbalance in said selected correction plane, and a pair of commutating devices simultaneously connected to receive said unbalance signal from said vibration pick-up means, said commutating devices being driven by said rotating means in synchronism with said rotating body and being spaced 90-electrical degrees apart for resolving said unbalance signal into a pair of unidirectional components the average values of which are representative of the unbalance at respective ones of said correction points.

6. Apparatus for automatically determining the magnitude of unbalance at each of a pair of fixed points spaced 90 degrees apart in each of a pair of axially spaced selected planes of correction through an elongated rotating body, said apparatus comprising, in combination, means supporting said body for rotation about its axis, means rotating said body about its axis, a nodal bar extending longitudinally of said body and operatively connected to said supporting means, a pair of electrical vibration pick-up means mounted at opposite nodal points of said nodal bar, a pair of space-quadrature related commutating means rotated in synchronism with said body for each of said vibration pick-up means and electrical connections from each of said vibration pick-up means to the pair of commutating means associated with each vibration pick-up means, an adjustable amplitude comparison balancing circuit for each of said commutating means and electrical connections connecting each commutating means in circuit with the amplitude comparison circuit associated therewith, each of said adjustable amplitude comparison circuits including a reference source of potential and a servo-motor controlled from said adjustable comparison circuit and operatively connected to effect balance thereof.

7. Apparatus for automatically resolving the total unbalance in a transaxial plane of a rotating body into a pair of radially directed components extending through a pair of fixed angularly spaced points on said body, said apparatus comprising, in combination, means supporting said body for rotation about its axis, means rotating said body about its axis, electrical vibration pick-up means responsive to vibrations of said body induced by unbalance therein, a pair of angularly spaced commutating means rotated in synchronism with said body and electrical connections from said vibration pick-up means to said commutating means, said commutating means reversing the connections from said pick-up means at 180 degree intervals and having the same angular relationship therebetween as that between the said fixed points on said body, and an adjustable amplitude comparison balancing circuit for each of said commutating means and connected in circuit therewith, each of said amplitude comparison circuits including a servo-motor controlled therefrom and operatively connected thereto for effecting balance thereof and a positionable means actuated by said servo-motor an amount corresponding to the unbalance at an associated one of said points on said body.

8. Apparatus for automatically separating and resolving the unbalance ascribable to a particular plane of correction of an elongated rotating body into a pair of components representative of said unbalance at a pair of fixed points on said body spaced 90 degrees apart in said correction plane, said apparatus comprising, in combination, means supporting said body for rotation about its axis, means rotating said body about its axis, vibration pick-up means responsive to vibrations of said body induced by unbalance therein and developing a periodically varying signal having characteristics related to the total unbalance in said plane of correction, and a pair of commutating devices simultaneously connected to receive said unbalance signal from said vibration pick-up means, said commutating devices being driven by said rotating means in synchronism with said rotating body and being spaced 90-electrical degrees apart for resolving said unbalance signal into a pair of unidirectional components the average values of which are representative of the unbalance at respective ones of said correction points on said body.

9. Apparatus for automatically determining the magnitude of unbalance at each of a pair of fixed points spaced 90 degrees apart in each of a pair of axially spaced selected planes of correction through an elongated rotating body, said apparatus comprising, in combination, means supporting said body for rotation about its axis, means rotating said body about its axis, a pair of electrical vibration pick-up means responsive to vibrations of said body, a pair of spaced-quadrature related commutating means rotated in synchronism with said body for each of said vibration pick-up means and electrical connections from each of said vibration pick-up means to the pair of commutating means associated with each vibration pick-up means, an adjustable amplitude comparison balancing circuit for each of said commutating means and electrical connections connecting each commutating means in circuit with the amplitude comparison circuit associated therewith, each of said adjustable amplitude comparison circuits including a reference source of potential and a servomotor controlled from said adjustable comparison circuit and operatively connected to effect balance thereof.

References Cited in the file of this patent

UNITED STATES PATENTS

| | | |
|---|---|---|
| 2,243,379 | Johnson | May 27, 1941 |
| 2,363,373 | Werner | Nov. 21, 1944 |

FOREIGN PATENTS

| | | |
|---|---|---|
| 642,916 | Great Britain | Sept. 13, 1950 |